United States Patent
Ryu et al.

(10) Patent No.: US 10,693,216 B1
(45) Date of Patent: *Jun. 23, 2020

(54) MOBILE TERMINAL HAVING AN ANTENNA INCLUDING DIELECTRICS ON A CIRCUIT BOARD

(71) Applicant: LG ELECTRONICS INC., Seoul (KR)

(72) Inventors: Seungwoo Ryu, Seoul (KR); Joohee Lee, Seoul (KR); Wonwoo Lee, Seoul (KR); Junyoung Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,506

(22) Filed: Feb. 21, 2020

Related U.S. Application Data

(63) Continuation of application No. 16/345,899, filed as application No. PCT/KR2016/012449 on Nov. 1, 2016, now Pat. No. 10,637,127.

(51) Int. Cl.
| | |
|---|---|
| *H01Q 1/24* | (2006.01) |
| *H04M 1/02* | (2006.01) |
| *H01Q 5/30* | (2015.01) |
| *H01Q 3/26* | (2006.01) |
| *H01Q 21/20* | (2006.01) |
| *H01Q 9/04* | (2006.01) |
| *H01Q 1/38* | (2006.01) |

(52) U.S. Cl.
CPC .............. *H01Q 1/243* (2013.01); *H01Q 1/24* (2013.01); *H01Q 1/38* (2013.01); *H01Q 3/26* (2013.01); *H01Q 5/30* (2015.01); *H01Q 9/04* (2013.01); *H01Q 21/20* (2013.01); *H04M 1/02* (2013.01); *H04M 1/026* (2013.01)

(58) Field of Classification Search
CPC ............ H01Q 1/243; H01Q 5/30; H01Q 1/24; H01Q 1/38; H01Q 21/20; H01Q 3/26; H01Q 21/205; H01Q 9/0435; H01Q 3/2623; H04M 1/026; H04M 1/02; H04M 1/0202
See application file for complete search history.

(56) References Cited

U.S. PATENT DOCUMENTS

| | | | |
|---|---|---|---|
| 10,056,683 B2 * | 8/2018 | Sharawi | H01Q 1/243 |
| 10,381,735 B2 * | 8/2019 | Miraftab | H01Q 21/0075 |
| 2007/0146210 A1 * | 6/2007 | Hilgers | H01Q 21/30 343/702 |

(Continued)

FOREIGN PATENT DOCUMENTS

| | | |
|---|---|---|
| KR | 10-2006-0123576 A | 12/2006 |
| KR | 10-2007-0095292 A | 9/2007 |

(Continued)

*Primary Examiner* — Brandon J Miller
(74) *Attorney, Agent, or Firm* — Birch, Stewart, Kolasch & Birch, LLP

(57) ABSTRACT

A mobile terminal includes a terminal body and an antenna device configured to generate a resonant frequency of a frequency band for 5G communication system. Further, the antenna device is an antenna array including a plurality of dielectrics operating as a resonator. The mobile terminal also includes a circuit board including a feeding unit and a ground plane and configured to be inserted into each of the dielectrics such that a portion of the circuit board protrudes outward.

13 Claims, 17 Drawing Sheets

(56) References Cited

U.S. PATENT DOCUMENTS

| | | | | |
|---|---|---|---|---|
| 2015/0222009 A1* | 8/2015 | Asou | .................. | H01Q 1/243 |
| | | | | 343/702 |
| 2015/0255856 A1* | 9/2015 | Hong | .................. | H01Q 1/243 |
| | | | | 343/702 |
| 2015/0282394 A1* | 10/2015 | Yumi | .................. | H05K 1/181 |
| | | | | 174/377 |
| 2017/0125901 A1* | 5/2017 | Sharawi | .................. | H01Q 3/24 |
| 2019/0013584 A1* | 1/2019 | Ryu | .................. | H01Q 21/08 |

FOREIGN PATENT DOCUMENTS

| | | | |
|---|---|---|---|
| KR | 10-2010-0049259 | A | 5/2010 |
| KR | 10-2010-0060887 | A | 6/2010 |
| KR | 10-2011-0052886 | A | 5/2011 |
| KR | 10-2012-0104896 | A | 9/2012 |
| KR | 10-1288159 | B1 | 7/2013 |
| KR | 10-2015-0091253 | A | 8/2015 |

* cited by examiner (a)

(b)

(c)

(d)

(a)

(b)

(c)

(a)

(b)

(a)  (b)

(c)  (d)

(a)

(b)

MOBILE TERMINAL HAVING AN ANTENNA INCLUDING DIELECTRICS ON A CIRCUIT BOARD

CROSS-REFERENCE TO RELATED APPLICATIONS

This Application is a Continuation of co-pending U.S. patent application Ser. No. 16/345,899 filed on Apr. 29, 2019, which is the National Phase of PCT International Application No. PCT/KR2016/012449 filed on Nov. 1, 2016, all of which are hereby expressly incorporated by reference into the present application.

BACKGROUND OF THE INVENTION

Field of the Invention

The present invention relates to a mobile terminal having both of a fourth-generation (4G) antenna and a fifth-generation (5G) antenna.

Discussion of the Related Art

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Meanwhile, efforts have been made to develop an enhanced 5G or pre-5G communication system to meet an increasing demand for wireless data traffic after deployment of 4G communication systems.

Therefore, the 5G or pre-5G communication system is also called a "Beyond 4G Network" or a "Post LTE System."

The 5G mobile communication system requires a transmission rate 1,000 times higher than in the Long-Term Evolution (LTE). In order to achieve such a transmission rate, research is being conducted on a communication system using a millimeter wave (mmWave) band. The mmWave band has a wide frequency band and strong linearity and also is capable of forming fine beams with a small antenna, thus providing a high transmission capacity.

The 5G communication system is considered to be implemented in an ultra-high frequency (mmWave) band, e.g., a band of 60 GHz, so as to accomplish higher data transmission rates. In order to decrease propagation losses of radio waves and increase transmission distances of radio waves in the ultra-high frequency band, beamforming, massive multiple-input multiple-output (MIMO), Full Dimensional MIMO (FD-MIMO), array antenna, analog beam-forming, and large-scale antenna techniques are being discussed for 5G communication systems.

However, a plurality of antenna elements are required to perform the FD-MIMO, array antenna, and beam-forming in a terminal. The plurality of antenna elements may cause interference with existing antenna elements when they are implemented in the same type as the existing antenna elements.

SUMMARY OF THE INVENTION

The present invention intends to solve these or other problems. The present invention is also directed to providing a mobile terminal with a 5G antenna device that does not degrade the performance of a 4G antenna.

In order to achieve these or other objects, according to an aspect of the present invention, there is provided a mobile terminal including a terminal body; a first antenna device provided inside the terminal body and configured to generate a resonant frequency of a first frequency band; and a second antenna device formed adjacent to the first antenna and configured to generate a resonant frequency of a second frequency band, wherein the second antenna device is an antenna array including a plurality of dielectrics operating as a resonator.

According to an aspect of the present invention, the mobile terminal may further include a main circuit board provided inside the terminal body, the plurality of dielectrics being placed on the main circuit board; and a feeding unit formed in the main circuit board to feed the plurality of dielectrics.

According to an aspect of the present invention, the plurality of dielectrics may be placed on the main circuit board.

According to an aspect of the present invention, the terminal body may include a metal cover, a non-metal member may be placed on the cover, and the second antenna device may be placed at a position overlapping the non-metal member.

According to an aspect of the present invention, the cover may be formed to include a non-metal member covering an upper surface of the terminal body, and the plurality of dielectrics may be formed to overlap the non-metal member.

According to an aspect of the present invention, the plurality of dielectrics may have a V-shaped cross section.

According to an aspect of the present invention, a plurality of holes may be formed in the non-metal member, and the plurality of dielectrics may be exposed outward through the plurality of holes.

According to an aspect of the present invention, intervals between the plurality of dielectrics may be 0.45 to 0.7 times a wavelength λ corresponding to a center frequency of the second frequency band.

According to an aspect of the present invention, a radiation pattern may be formed to be omni-directional by beamforming of the plurality of dielectrics.

According to an aspect of the present invention, a plurality of cut portions may be formed at an end of the main circuit board, and the plurality of dielectrics may be placed on the cut portions.

According to an aspect of the present invention, the feeding unit may be formed as one of a via type, a strip patch type, and a dual feeding type.

According to an aspect of the present invention, each of the dielectrics may be placed on a ground plane. In this case, the ground plane may be formed by a plurality of via holes passing through the main circuit board. Alternatively, the ground plane may be implemented on a surface of an antenna chip corresponding to an internal circuit.

According to an aspect of the present invention, a circuit board including a feeding unit and a ground plane may be inserted into each of the dielectrics such that a portion of the circuit board protrudes outward. In this case, the dielectrics may be inserted up to a position separated from one end of the ground plane.

According to an aspect of the present invention, the protruding portion may be engaged through an insertion part of a main circuit board.

According to an aspect of the present invention, the dielectrics may have a shape in which first and second slots are removed from an internal region with a large higher-order mode component. In this case, the first and second slots may have lengths of WL1 and WL2 and a width of WW.

Advantageous Effects

The effects of the mobile terminal of according to the present invention are as follows.

According to at least one of the embodiments of the present invention, it is possible to prevent performance degradation of a 4G antenna by forming an antenna array of a plurality of dielectrics as a resonator, and also there is no need to increase the size of a bezel because no additional space is required.

In addition, according to at least one of the embodiments of the present invention, since a half power beam width (HPBW) of 270° can be implemented, 5G service is possible even when a single chip is installed in a mobile terminal.

A further scope of applicability of the present invention will become apparent from the detailed description given below. It should be understood, however, that the detailed description and specific examples, such as the preferred embodiments of the invention, are given by way of illustration only, since various changes and modifications within the spirit and scope of the invention will be apparent to those skilled in the art.

DETAILED DESCRIPTION OF THE EMBODIMENTS

Figure 1A:
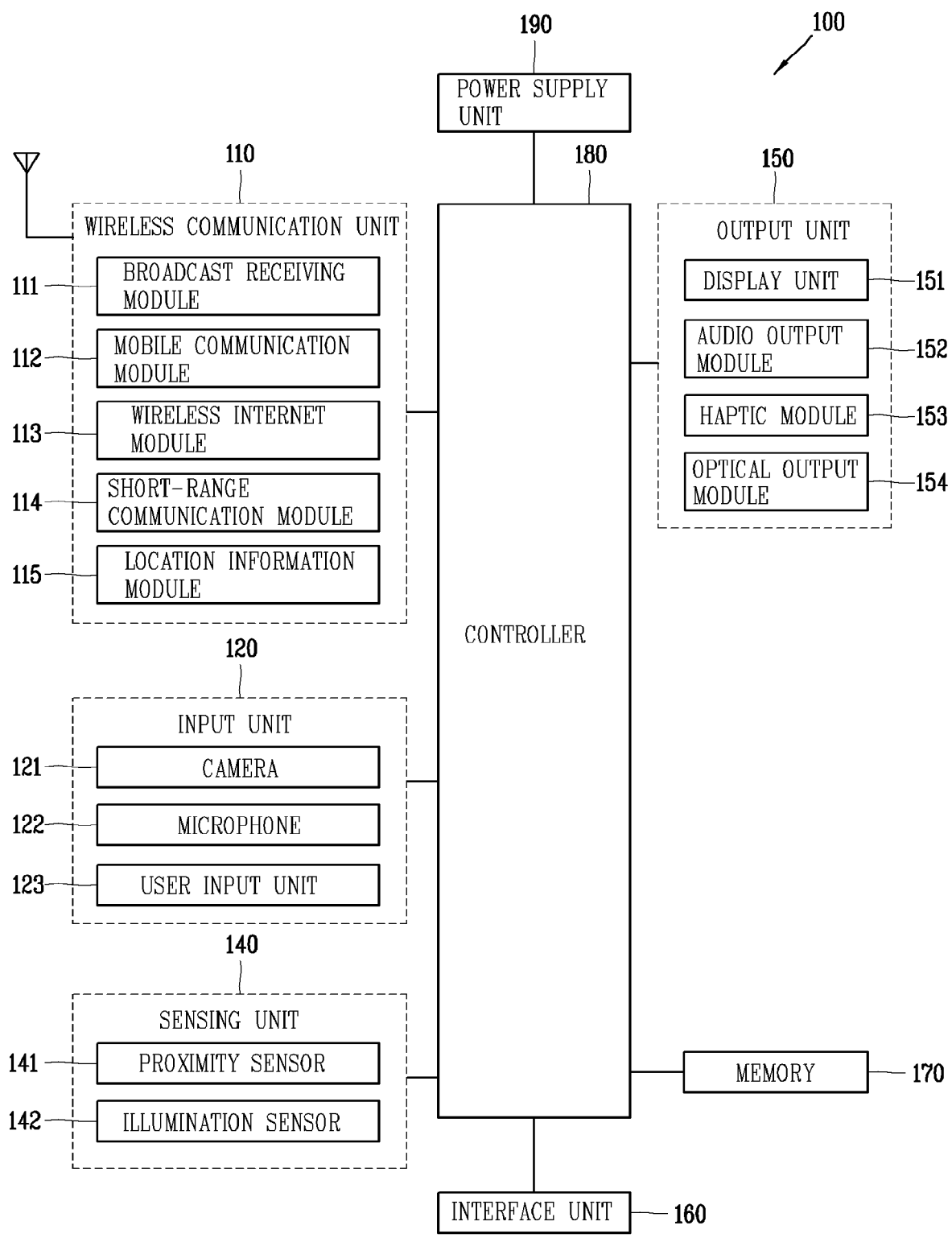
FIG. 1A is a block diagram illustrating a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
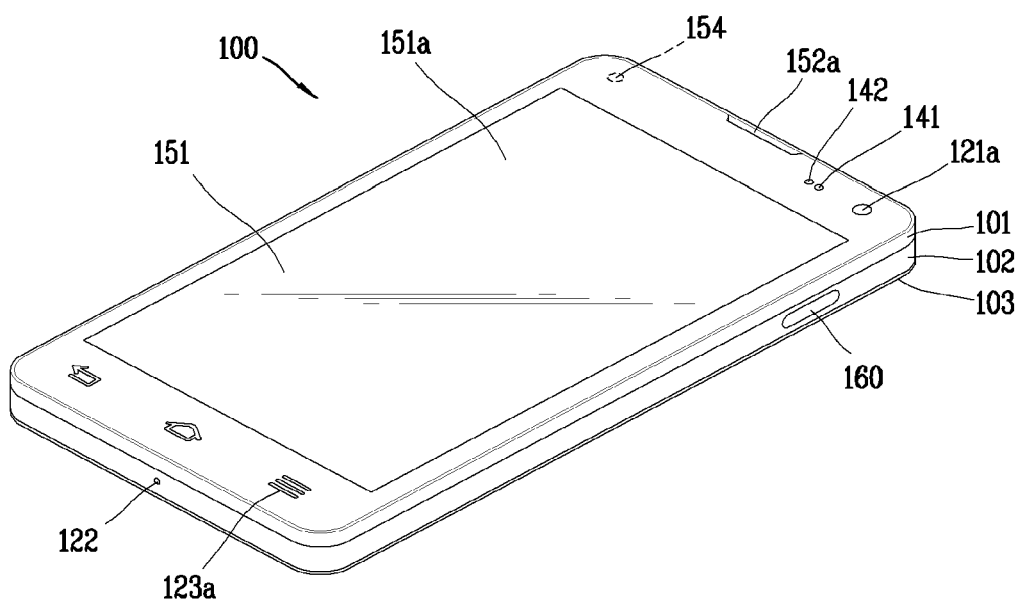
FIGS. 1B and 1C are conceptual diagrams showing an example of a mobile terminal according to the present invention when viewed from different directions.
Figure 1C:
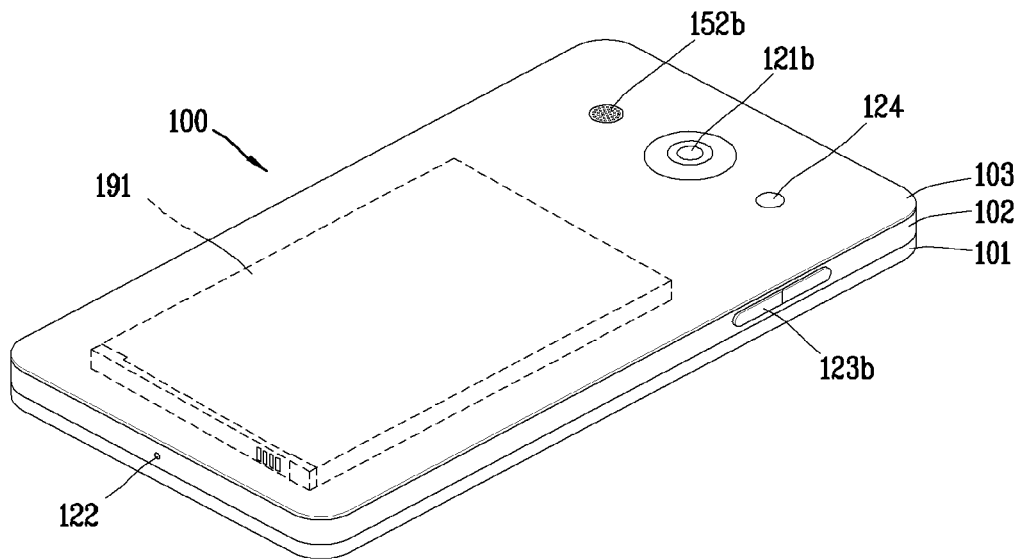

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the mobile terminal 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, considering the mobile terminal 100 as at least one assembly, the terminal body may be understood as a conception referring to the assembly.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. In this case, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this case, a mobile terminal 100 having a uni-body is formed in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

The mobile terminal 100 may include a display unit 151, first and second audio output module 152*a* and 152*b*, a proximity sensor 141, an illumination sensor 142, an optical output module 154, first and second cameras 121*a* and 121*b*, first and second manipulation units 123*a* and 123*b*, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152*a*, the proximity sensor 141, the illumination sensor 142, the optical output module 154, the first camera 121*a*, and the first manipulation unit 123*a*, the side surface of the terminal body is shown having the second manipulation unit 123*b*, the microphone 122, and the interface unit 160, and the rear surface of the terminal body is shown having the second audio output module 152*b* and the second camera 121*b*.

However, those components may not be limited to the arrangement. Some components may be omitted or rearranged or located on different surfaces. For example, the first manipulation unit 123*a* may be located on another surface of the terminal body, and the second audio output module 152*b* may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

On the other hand, the touch sensor may be configured in a form of a film having a touch pattern and disposed between a window 151a and a display (not illustrated) on a rear surface of the window, or may be a metal wire directly patterned on the rear surface of the window. Alternatively, the touch sensor may be formed integrally with the display. For example, the touch sensor may be disposed on a substrate of the display, or may be provided inside the display.

In this way, the display unit 151 may form a touch screen together with the touch sensor, and in this case, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia reproduction request sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this case, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 may control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121*b* may include a plurality of lenses arranged along at least one line. The plurality of lenses may be arranged in a matrix form. The cameras may be referred to as an 'array camera.' When the second camera 121*b* is implemented as the array camera, images may be captured in various manners using the plurality of lenses and images with better qualities may be obtained.

The flash 124 may be disposed adjacent to the second camera 121*b*. When an image of a subject is captured with the camera 121*b*, the flash 124 may illuminate the subject.

The second audio output module 152*b* may further be disposed on the terminal body. The second audio output module 152*b* may implement stereophonic sound functions in conjunction with the first audio output module 152*a*, and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

An embodiment of the present invention relates to a mobile terminal 100 having a fifth-generation (5G) antenna that does not degrade the performance of a fourth-generation (4G) antenna provided in a terminal body.

A frequency of 2 GHz or less is mainly used for 4G mobile communication while an ultra-high frequency of about 28 GHz is used for 5G mobile communication unlike the 4G Long Term Evolution (LTE). A low band of frequencies has a long wavelength and thus wide coverage, but has a low transmission rate because communication using a low-band frequency has a relatively narrow bandwidth and thus a low transmission rate. On the other hand, a high band of frequencies has a short wavelength and thus narrow coverage, but communication using a high-band frequency has a relatively wide bandwidth and thus a high transmission rate. In addition, the communication using the high-band frequency can solve the coverage constraint to some extent by using an array antenna, propagation characteristics with high linearity, etc. Therefore, the 5G mobile communication can increase capacity that has not been enough, provide a variety of communication services to users, and provide mobile Internet technology and machine-to-machine (M2M) technology.

When a metal material is used for radiation of an antenna for 5G mobile communication, it is possible to degrade the performance of an antenna for 4G mobile communication that was conventionally used. For example, an optimal position for a 5G antenna array system may overlap an optimal position for 4G MIMO antenna. In this case, the performance of the 4G antenna may be reduced by about 4 dB to 5 dB. In order to prevent this problem, the size of the mobile terminal 100 must be increased.

Typically, a beam pattern of a 5G antenna array system is formed in the range of −60° to +60°, so that the system cannot receive necessary information in all directions. Thus, the number of 5G chips 132 must be increased to three to four, and multiple chips 132 must be built in a mobile terminal 100 while being spaced apart from each other.

To solve such a problem, a 5G mobile communication antenna is configured as a dielectric array according to an embodiment of the present invention.

In the following description, 4G mobile communication antennas will be referred to as first antenna devices 145*a* and 145*b*, and a 5G mobile communication antenna will be referred to as a second antenna device 130.

Figure 1D:
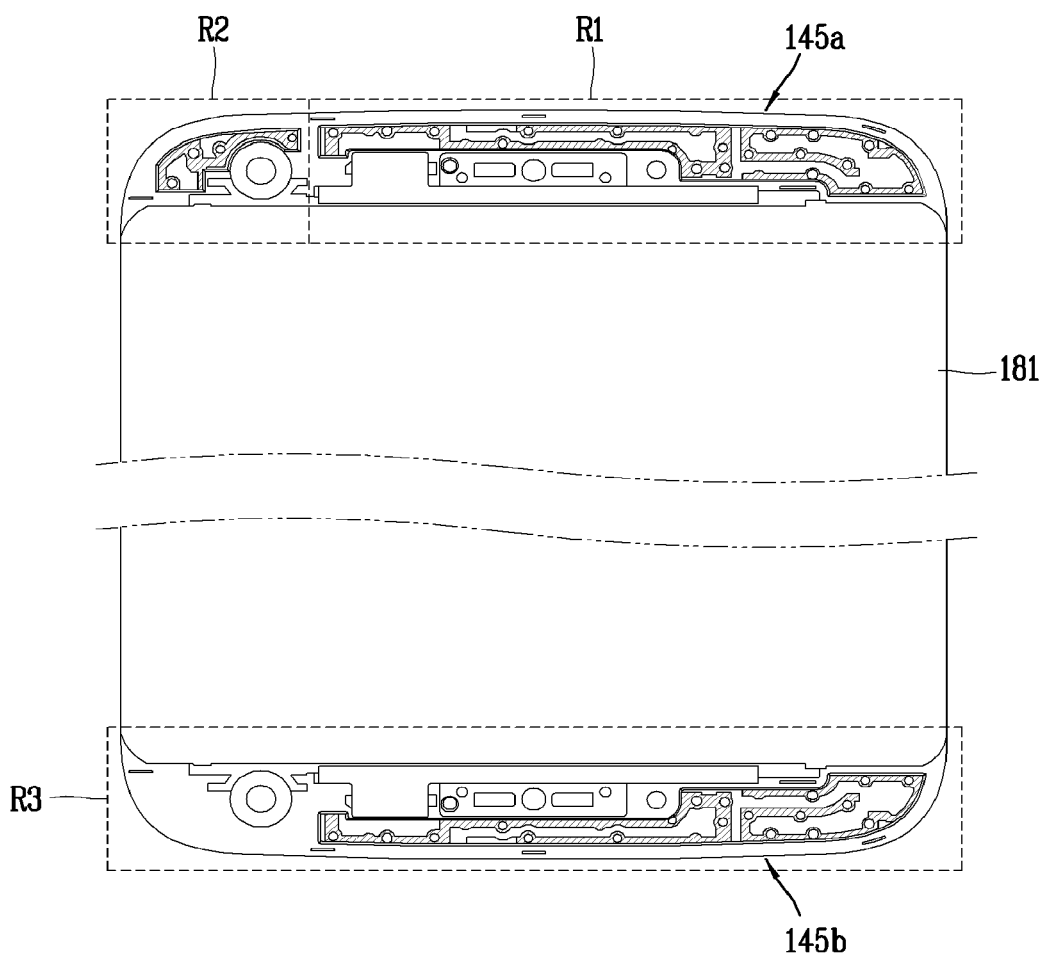
FIG. 1D shows that first antenna devices are arranged according to an embodiment of the present invention.
Figure 2:
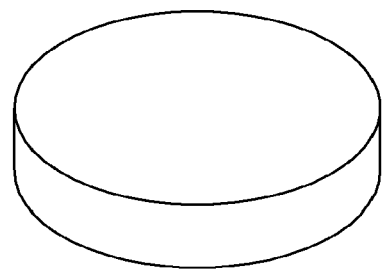
FIG. 2 shows an example of a schematic shape of a dielectric according to an embodiment of the present invention.
Figure 2:
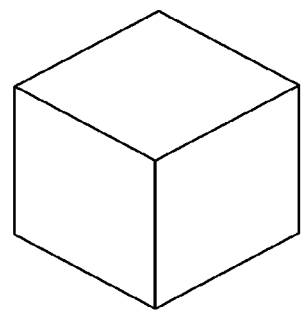
Figure 2:
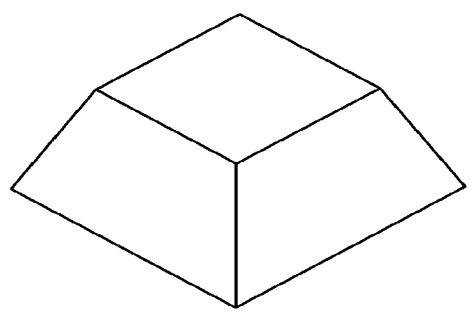
Figure 2:
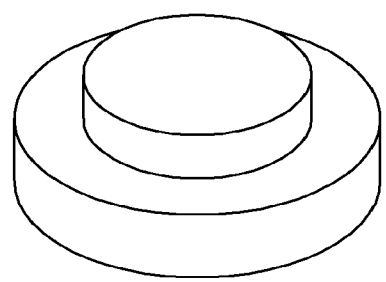

FIG. 1D shows that the first antenna devices 145*a* and 145*b* are arranged according to an embodiment of the present invention. Referring to FIG. 1D, the antenna devices 145*a* and 145*b* are provided on upper and lower sides of the mobile terminal 100.

The first antenna devices 145*a* and 145*b* are provided on upper and lower sides of a front casing 101 and a second casing 102 of the mobile terminal 100. In this case, the first antenna provided on the upper side may be referred to as an upper antenna 145*a*, and the first antenna provided on the lower side may be referred to as a lower antenna 145*b*. In this case, the second antenna device 130 may be formed in at least one of an upper region R1 of the mobile terminal 100, a side region R2 of the mobile terminal 100, or a lower region R3 of the mobile terminal 100, which is shown in FIG. 1D. However, the second antenna device 130 should not degrade antenna performance of the first antenna devices 145*a* and 145*b* even though the second antenna device 130 is adjacent to or spatially overlaps the first antenna devices 145*a* and 145*b*.

That is, the mobile terminal 100 according to an embodiment of the present invention includes a terminal body, first antenna devices 145*a* and 145*b* provided inside the terminal body and configured to generate a resonant frequency of a first frequency band, and a second antenna device 130 formed adjacent to the first antennas and configured to generate a resonant frequency of a second frequency band. In this case, the second antenna device 130 is configured as an antenna array including a plurality of dielectrics 135 that operate as a resonator, so that the second antenna device 130 does not affect the performance of the first antenna devices 145*a* and 145*b*.

The first frequency band is the above-described frequency band for 4G mobile communication, which is a frequency band of 2 GHz or less. The second frequency band is a frequency band for 5G mobile communication, which is a frequency band of tens of GHz. That is, the second frequency band may be an ultra-high frequency (mmWave) band.

When a dielectric 135 is used as the resonator of the second antenna device 130 instead of a metal material, the radiation performance of the second antenna device 130 may be maintained without affecting the antenna performance of the adjacent first antenna devices 145a and 145b. In this case, since the dielectric 135 operates as the resonator, the dielectric 135 may be referred to as a dielectric resonator (DR), and the second antenna device 130 may be referred to as a dielectric resonator antenna (DRA).

As shown in FIGS. 2A to 2D, the dielectric 135 may have a cylindrical or polygonal shape or a pyramid shape. Also, the dielectric 135 may have a shape formed by two or more cylinders. These shapes are merely examples and not particularly limited. However, a rectangular parallelepiped shape will be advantageous in term of implementability.

In this case, preferably, the dielectric 135 used in an embodiment of the present invention has a dielectric constant of 4 to 140 and a low loss tangent. However, a dielectric 135 having a dielectric constant of about 6 to 10 may be used in terms of cost savings.

The displacement of a feeding unit 131 configured to feed power to a plurality of such dielectrics 135 may be a problem, which will be described with reference to FIGS. 3 to 5.

Figure 3:
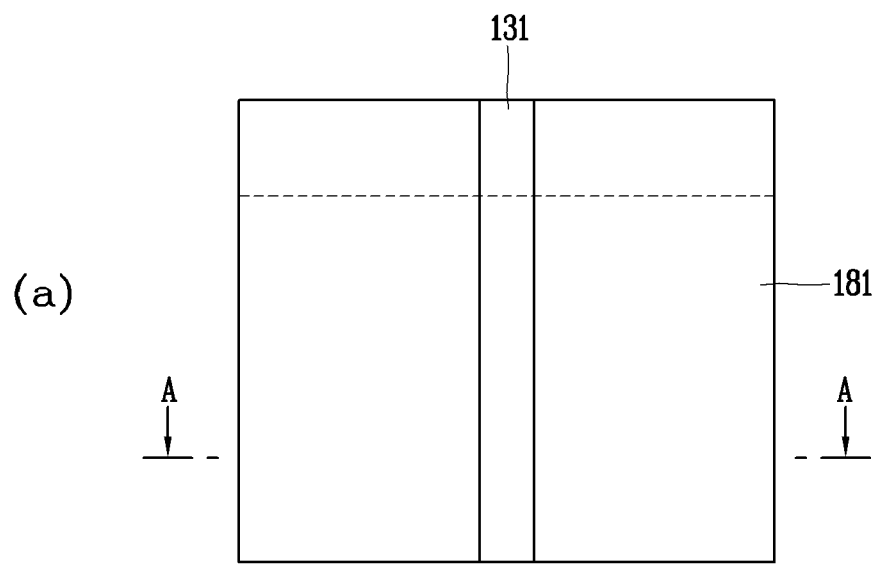
FIGS. 3 to 5 are schematic diagrams showing a structural form of a feeding unit according to an embodiment of the present invention.
Figure 3:
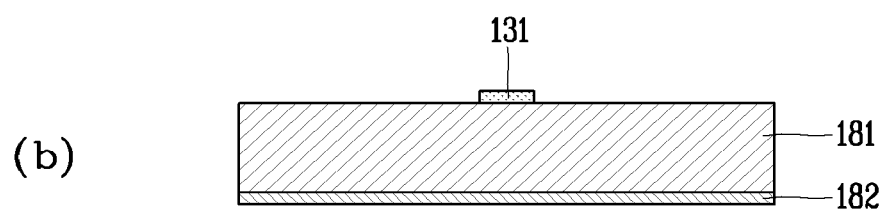
Figure 3:
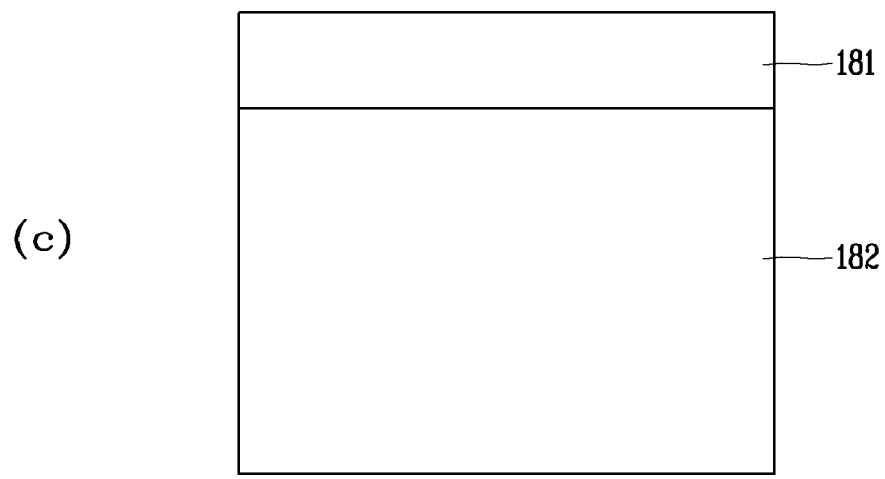
Figure 4:
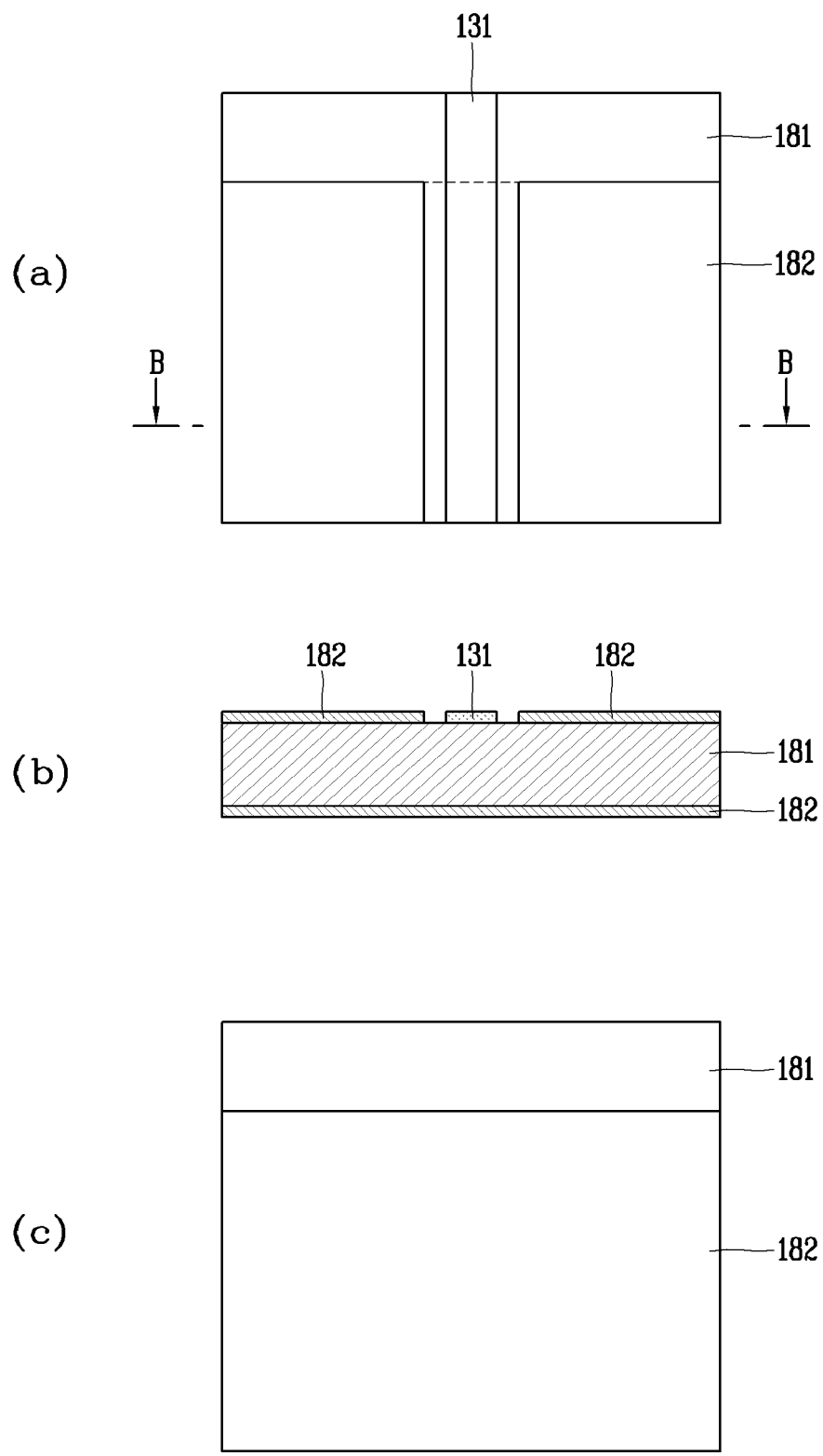
Figure 5:
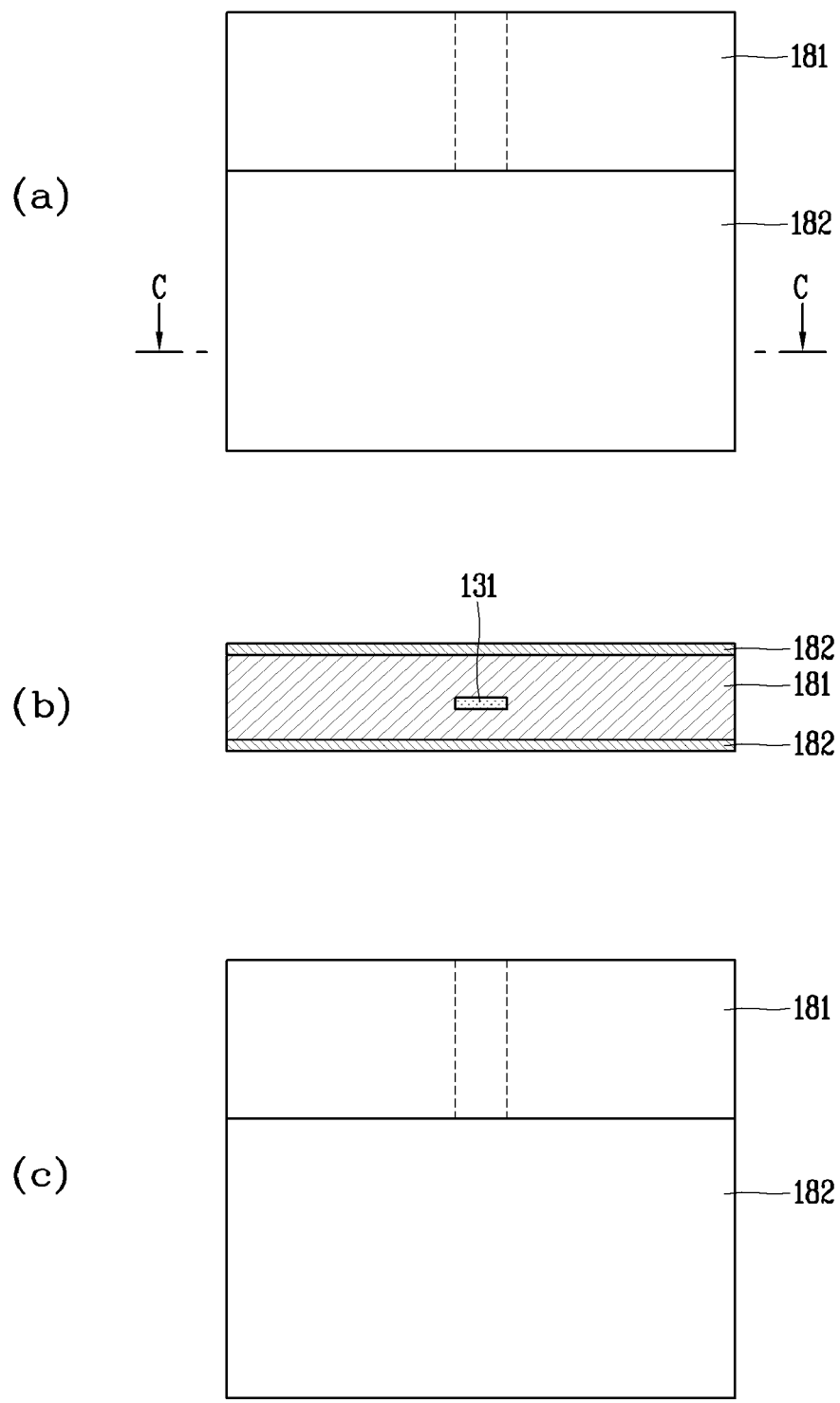

FIGS. 3A to 5C are schematic diagrams showing a structural form of the feeding unit 131 according to an embodiment of the present invention. FIG. 3A is a diagram of a feeding unit 131 formed in a main circuit board 181 when viewed from the top, FIG. 3B is a cross-sectional view taken along line A-A of FIG. 3A, and FIG. 3C is a rear view of FIG. 3A. Similarly, FIG. 4A is a diagram of a feeding unit 131 formed in a main circuit board 181 when viewed from the top, FIG. 4B is a cross-sectional view taken along line B-B of FIG. 4A, and FIG. 4C is a rear view of FIG. 4A. Also, FIG. 5A is a diagram of a feeding unit 131 formed in a main circuit board 181 when viewed from the top, FIG. 5B is a cross-sectional view taken along line C-C of FIG. 5A, and FIG. 5C is a rear view of FIG. 5A.

Referring to FIGS. 3A to 5C, a ground plane 182 is formed at a lower portion, and the main circuit board 181 is provided on the ground plane 182. In more detail, in FIGS. 3A to 3C, the main circuit board 181 is stacked on the ground plane 182, and the strip-type feeding unit 131 is formed on the main circuit board 181. In this case, the ground plane 182 may be formed to have a smaller area than the main circuit board 181.

Referring to FIGS. 4A to 4C, it can be seen that FIGS. 4A to 4B are similar to FIGS. 3A to 3C. However, it can be seen that the ground plane 182 other than the feeding unit 131 is additionally formed on the main circuit board 181. That is, such ground planes 182 are formed on both surfaces of the main circuit board 181, and the feeding unit 131 may be formed on one surface of the main circuit board 181.

As shown in FIGS. 5A to 5C, it can be seen that the feeding unit 131 is placed inside the main circuit board 181 and the ground planes 182 are formed on both surfaces of main circuit board 181.

FIGS. 3A to 5C illustrate examples in which the feeding unit 131 is formed on the main circuit board 181, but the present invention is not limited thereto and various combinations are possible. For example, the formation may be made in combination of FIGS. 3A to 5C. In this case, the feeding unit 131 may be called a signal line.

According to an embodiment of the present invention, the plurality of dielectrics 135 may be placed on the main circuit board 181. The placement of the dielectrics 135 on the main circuit board 181 formed by stacking multiple layers may be classified into a case in which upper layers of the main circuit board 181 are partially cut out and then the dielectrics 135 are stacked thereon and a case in which the dielectrics 135 are placed on the uppermost layer of the main circuit board 181.

Figure 12A:
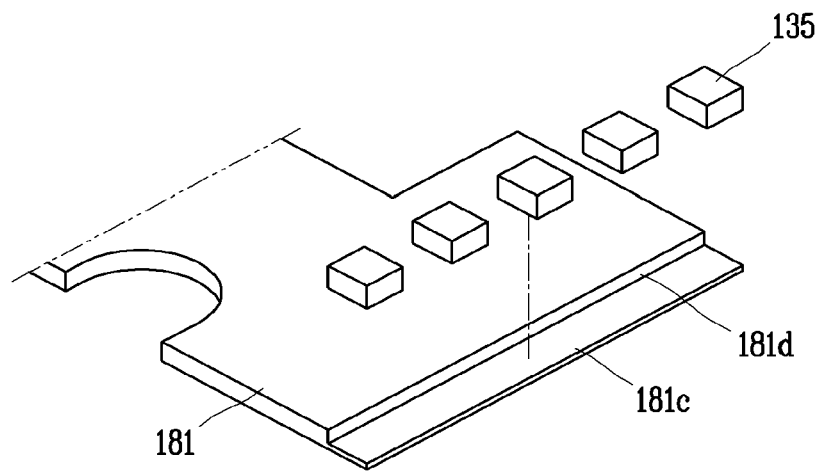
FIGS. 12A and 12B show that a plurality of dielectrics are arranged on a main circuit board according to an embodiment of the present invention.
Figure 12B:
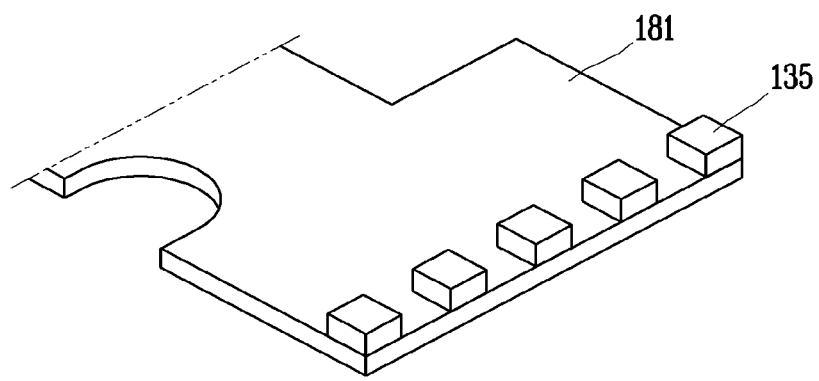

That is, FIGS. 12A and 12B show that the plurality of dielectrics 135 are placed on the main circuit board 181 according to an embodiment of the present invention, wherein FIG. 12A corresponds to the former case and FIG. 12B corresponds to the latter case.

In more detail, as shown in FIG. 12A, when the main circuit board 181 is formed by stacking a first part 181c and a second part 181d, the plurality of dielectrics 135 may be placed on the first part 181c with the second part 181d partially cut out. That is, while the second part 181d is partially cut out, the plurality of dielectrics may be inserted into a part formed through the cutting.

Also, as shown in FIG. 12B, the plurality of dielectrics 135 may be placed on the uppermost layer of the main circuit board 181, i.e., the surface of the main circuit board 181.

Figure 6A:
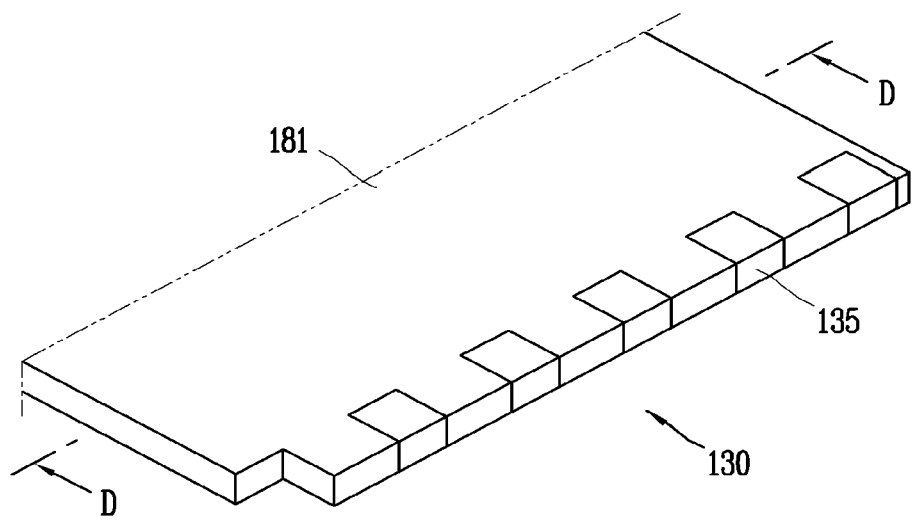
FIG. 6A is a diagram showing a dielectric formed in a main circuit board according to an embodiment of the present invention.
Figure 6B:
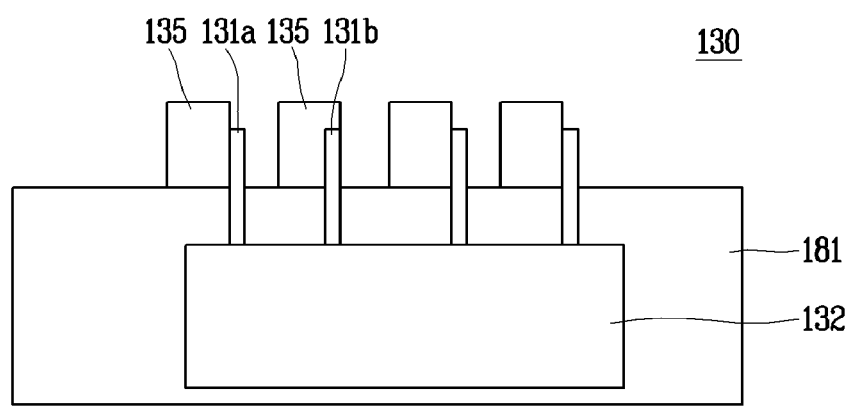
FIG. 6B is a cross-sectional view taken along line D-D of FIG. 6A.

FIG. 6A is a diagram showing a dielectric 135 and a second antenna device 130 formed on a main circuit board 181 according to an embodiment of the present invention, and FIG. 6B is a cross-sectional view taken along line D-D of FIG. 6A.

The dielectric 135 and a feeding unit 131 formed on the main circuit board 181 will be described below with reference to FIGS. 6A and 6B.

FIG. 6A shows that a plurality of cut portions are formed at an end of the main circuit board 181 and the plurality of dielectrics 135 are placed on the cut portions. In this case, the end of the main circuit board 181 may be composed of a convex portion and a concave portion, and the plurality of dielectrics 135 may be placed on the concave portion. The concave portion is a portion formed by partially cutting the main circuit board 181, and thus may be referred to as a cut portion.

Figure 10:
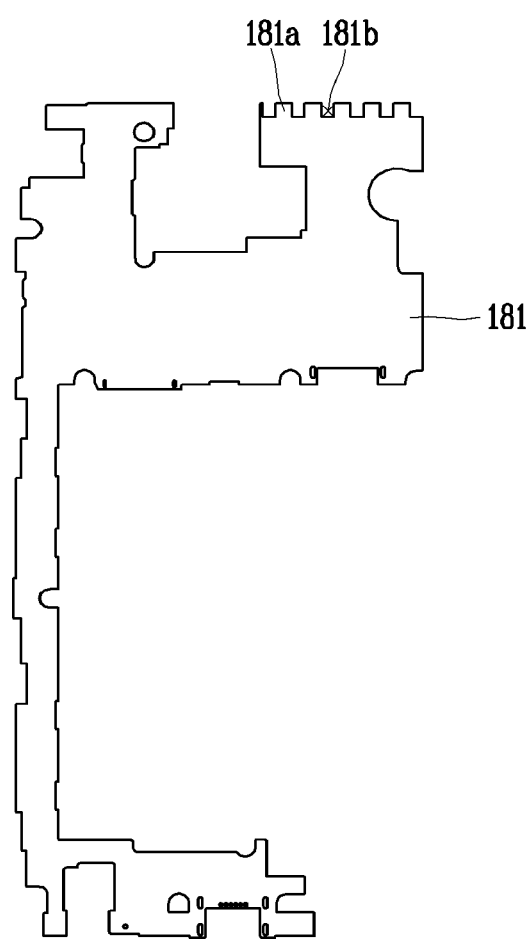
FIG. 10 shows a schematic shape of a main circuit board according to an embodiment of the present invention.
Figure 11A:
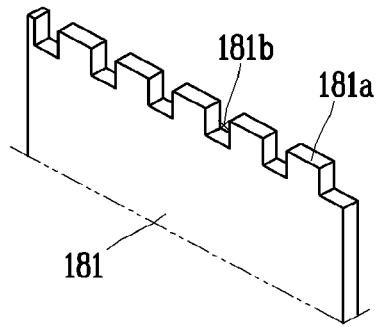
FIGS. 11A to 11C show that a plurality of dielectrics according to an embodiment of the present invention are arranged on a main circuit board.
Figure 11B:
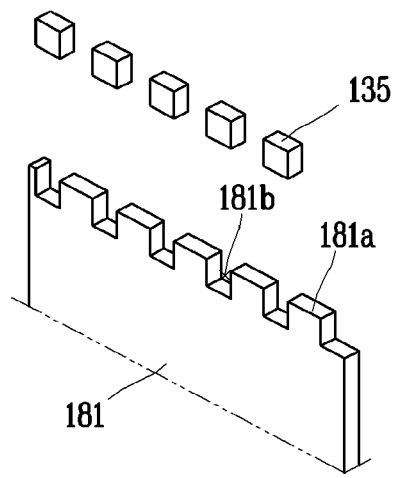
Figure 11C:
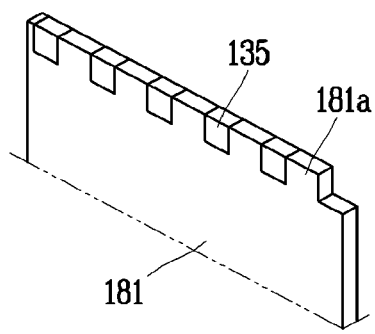

This is as shown in FIGS. 10 to 11C. FIG. 10 shows a schematic shape of the main circuit board 181 according to an embodiment of the present invention, and FIGS. 11A to 11C show that a plurality of dielectrics 135 are placed on the main circuit board 181 according to an embodiment of the present invention. As shown in FIGS. 10 and 11A, according to an embodiment of the present invention, an upper portion of the main circuit board 181 is partially cut out to form a concave-convex pattern composed of a convex portion 181a and a concave portion 181b. As shown in FIG. 11B, the plurality of dielectrics 135 are inserted into the concave portion 181b. When the plurality of dielectrics 135 have the same size as the concave portion 181b, it may seem to form the single main circuit board 181 in external appearance, as shown in FIG. 11C. In this case, it is easy for the plurality of dielectrics 135 to be inserted into the concave portion 181b when the shape of the dielectrics 135 is a rectangular parallelepiped.

Preferably, intervals between the plurality of dielectrics 135 is 0.45 to 0.7 times a wavelength λ corresponding to a center frequency of the second frequency band. Also, the intervals between the plurality of dielectrics 135 do not necessarily have to be constant, and the plurality of dielectrics 135 may be arranged at regular or different intervals depending on the antenna properties.

Referring to FIGS. 6A and 6B again, an antenna chip 132 is provided inside the main circuit board 181, and a feeding unit 131 is formed to extend from the chip 132 to the dielectrics 135. In this case, the method of forming the feeding unit 131 may be of a via type, a strip patch type, and a dual feeding type.

The via type means that a via hole is formed inside the dielectric 135 and the dielectric 135 is placed in the via hole. That is, as shown in FIG. 6B, a feeding unit 131b extending from the chip 132 is inserted into and placed in the dielectric 135.

Also, the strip patch type means that a strip-type feeding unit 131a is placed in contact with a side surface of the dielectric 135. This is a case in which the feeding unit 131a extending from the chip 132 is placed in contact with the surface of the dielectric 135, as shown in FIG. 6B.

Figure 7:
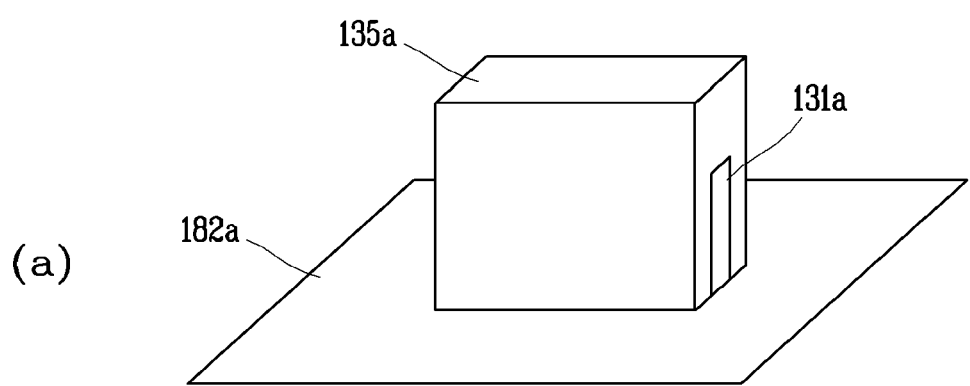
FIG. 7 shows structures of two types of dielectric antennas depending on the arrangement of a ground plane.
Figure 7:
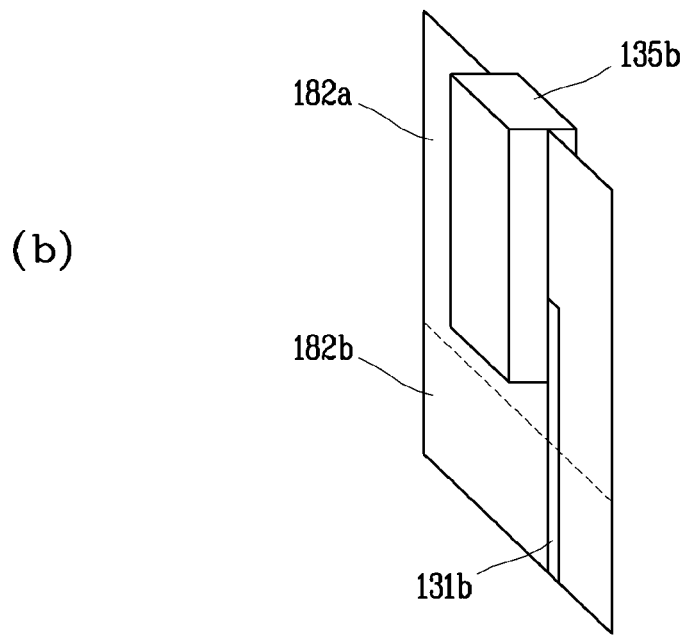
Figure 8:
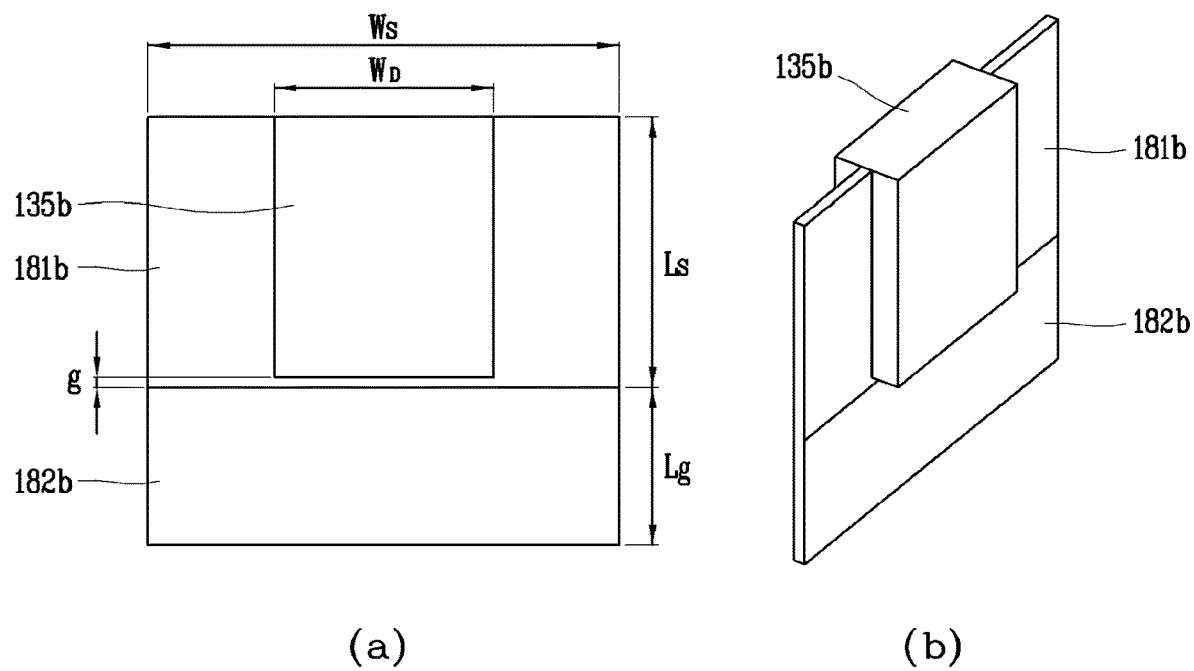
FIG. 8 shows a rear view, a perspective view, a front view, and a side view of a vertical-ground-plane-edge-type dielectric antenna.
Figure 8:
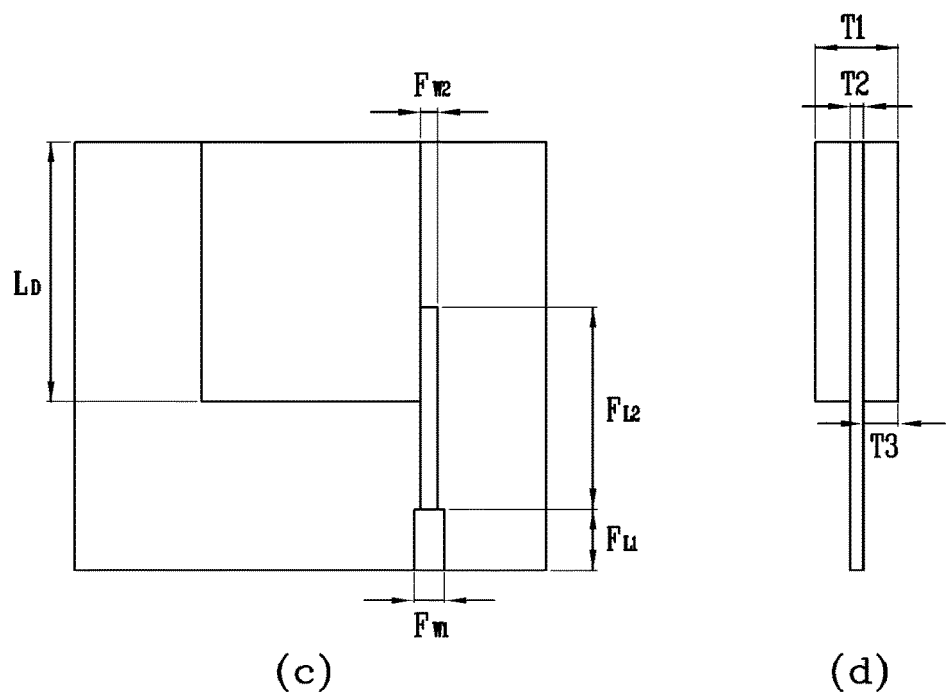

FIGS. 7 and 8 show a dielectric antenna according to another embodiment of the present invention. In this regard, FIG. 7 shows structures of two types of dielectric antennas depending on the arrangement of a ground plane. Also, FIG. 8 shows a rear view, a perspective view, a front view, and a side view of a vertical-ground-plane-edge-type dielectric antenna.

As shown in FIG. 7A, the first structure is a structure in which a ground plane 182a is positioned on a rear surface and a dielectric 135a is placed on the ground plane 182a. The first structure corresponds to a dielectric antenna mounted on a horizontal ground plane (a perpendicular ground plane) and thus may be referred to as a horizontal ground plane structure.

Also, as shown in FIG. 7B, the second structure is a structure in which a circuit board 181b including a feeding unit 131b and a ground plane 182b is inserted into a dielectric 135b. The second structure corresponds to a dielectric antenna mounted through a vertical ground plane edge (a perpendicular ground plane edge) and thus may be referred to as a vertical ground plane edge structure.

Meanwhile, the horizontal ground plane structure corresponding to the first structure and the vertical ground plane edge structure corresponding to the second structure will be described with reference to FIGS. 6A and 6B.

First, the first structure will be described. The ground plane 182a may be implemented as a plurality of via holes passing through a main circuit board 181 or may be implemented on a surface of the antenna chip 132 corresponding to an internal circuit. When the plurality of via holes operate as the ground plane 182a, the number of via holes may be determined as follows. That is, the number of via holes may be determined such that the plurality of via holes are arranged over a predetermined region at a certain interval or less. Referring to FIG. 6, the first structure is a structure in which a signal is applied to the dielectric 135a by the strip-type feeding unit 131a.

Next, the second structure will be described. The circuit board 181b including the feeding unit 131b and the ground plane 182b may be provided separately from the main circuit board 181. To this end, the circuit board 181b may be inserted into the dielectric 135b such that a portion of the circuit board 181b protrudes from the dielectric 135b, and the protruding portion may be engaged through an insertion part of the main circuit board 181.

Meanwhile, FIG. 8 shows (a) a rear view, (b) a perspective view, (c) a front view, and (d) a side view of the dielectric antenna having the vertical ground plane edge structure. As shown in FIG. 8, the ground plane 182b is placed at a lower end of a rear surface of the circuit board 181b with a certain width Lg. Also, the dielectric 135b is inserted into a position g spaced from one end of the ground plane 182b. Meanwhile, the strip-type feeding unit 132b applies a signal to the dielectric 135b. In this case, the feeding unit 132b may be directly attached to the dielectric 135b or may be connected to the dielectric 135b through a metal pad of the circuit board 181b on which the dielectric 135b is placed.

Figure 9:
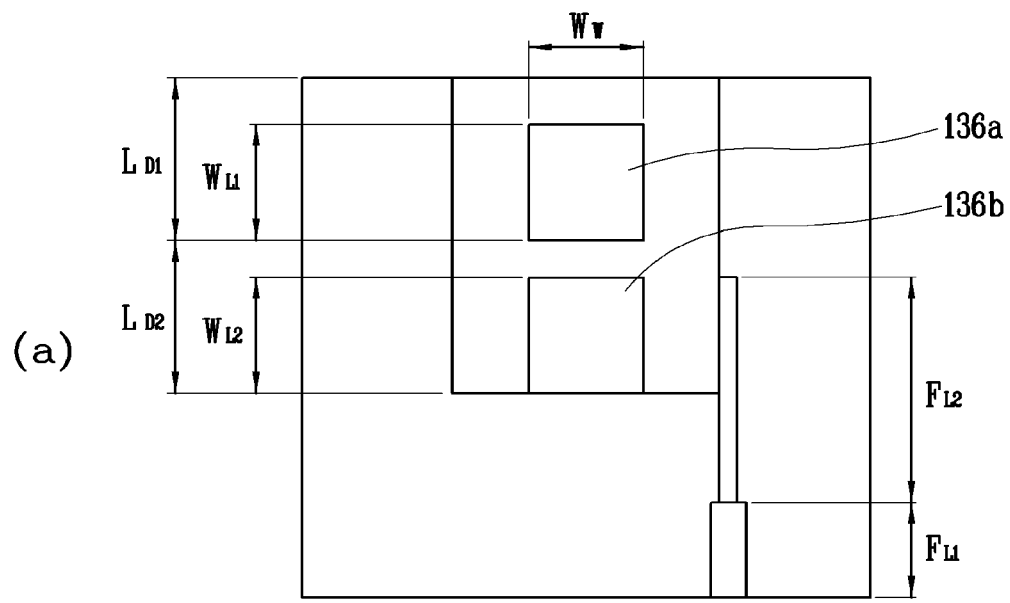
FIG. 9 shows a shape of a dielectric antenna according to still another embodiment of the present invention.
Figure 9:
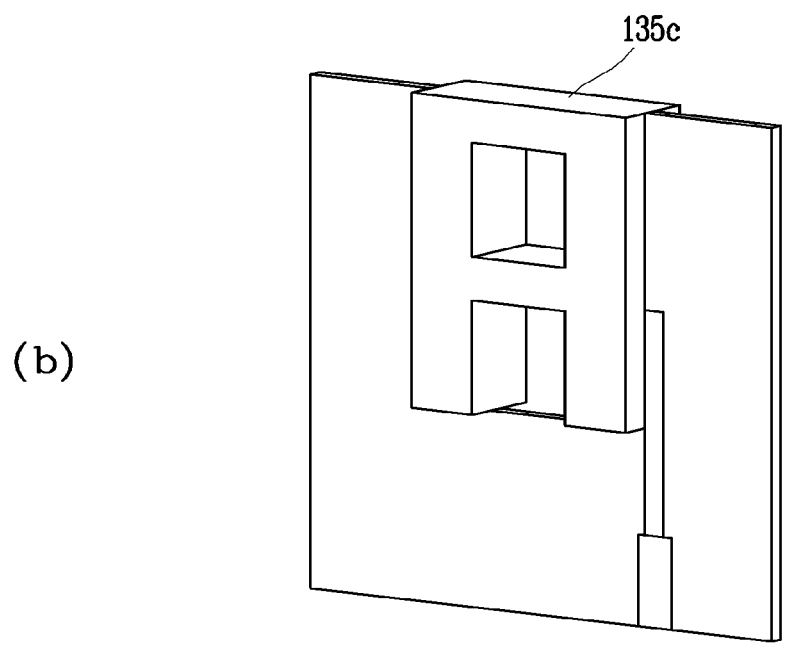

Referring to FIG. 2 again, the dielectric 135 may be designed in various shapes. The dielectric 135 may be optimized to improve antenna performance including radiation performance. In this regard, FIG. 9 shows the shape of a dielectric antenna according to still another embodiment of the present invention.

In this regard, the second dielectric 135c has a shape in which internal regions are removed from the dielectrics 135, 135a, and 135b shown in FIGS. 2 to 8. That is, the second dielectric 135 has a shape in which first and second slots 136a and 136b corresponding to two rectangular parallelepiped regions are removed from the insides of the dielectrics 135, 135a, and 135b. In this case, the second dielectric 135 has a length of LD1+LD2 and a width of W. Also, the first and second slots 136a and 136b have lengths of WL1 and WL2 and a width of WW.

The dielectrics 135, 135a, and 135b may internally have asymmetric radiation patterns due to desired higher-order mode components. Therefore, it is necessary to remove unwanted radiation due to a higher-order mode from the insides of the dielectrics 135, 135a, and 135b. That is, the second dielectric 135c is formed by placing the first and second slots 136a and 136b in regions of the dielectrics 135, 135a, and 135b with large higher-order mode components. In this case, the number of slots is not limited to two, but is freely changeable according to the distribution of the higher-order mode components. Alternatively, the lengths and widths of the slots may have different dimensions. Alternatively, the insides of the first and second slots 136a and 136b may be filled as well as empty.

Figure 14A:
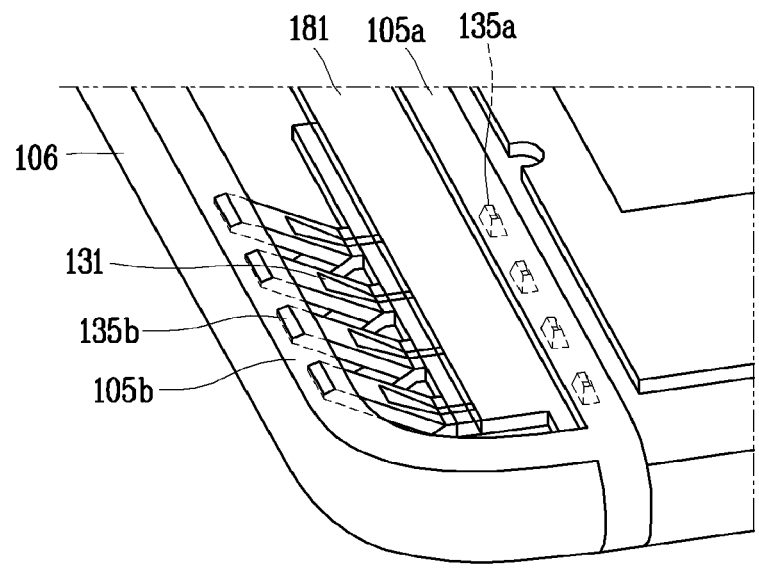
FIGS. 14A and 14B show that a plurality of dielectrics according to an embodiment of the present invention are formed on a ring member.
Figure 14B:
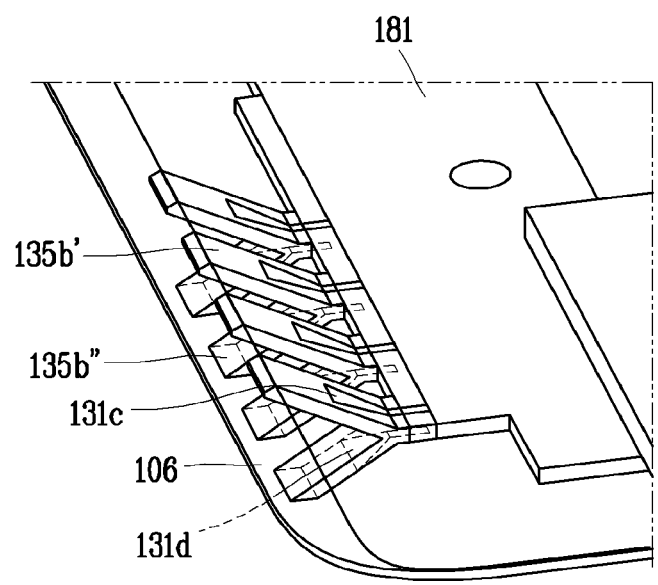

A dielectric antenna including a plurality of feeding units will be described below. A type including the plurality of feeding units may be referred to as a duel-feeding type. The dual-feeding type means a case in which two or more feeding units 131c and 131d are arranged, i.e., a case in which both the first feeding unit 131c and the second feeding parts shown in FIG. 14b are provided. This will be described below. In addition, the feeding method may include a traveling wave exciting type.

As described above, in order to implement an antenna by means of a radiating dielectric 135, the performance of the antenna device that is already provided should not be affected. In particular, when the cover of the mobile terminal 100 is made of a metal material, the radiating dielectric 135 should be placed such that a slit is formed by a non-metal member 105 and then radiation is made toward the area of the non-metal member 105.

Figure 13A:
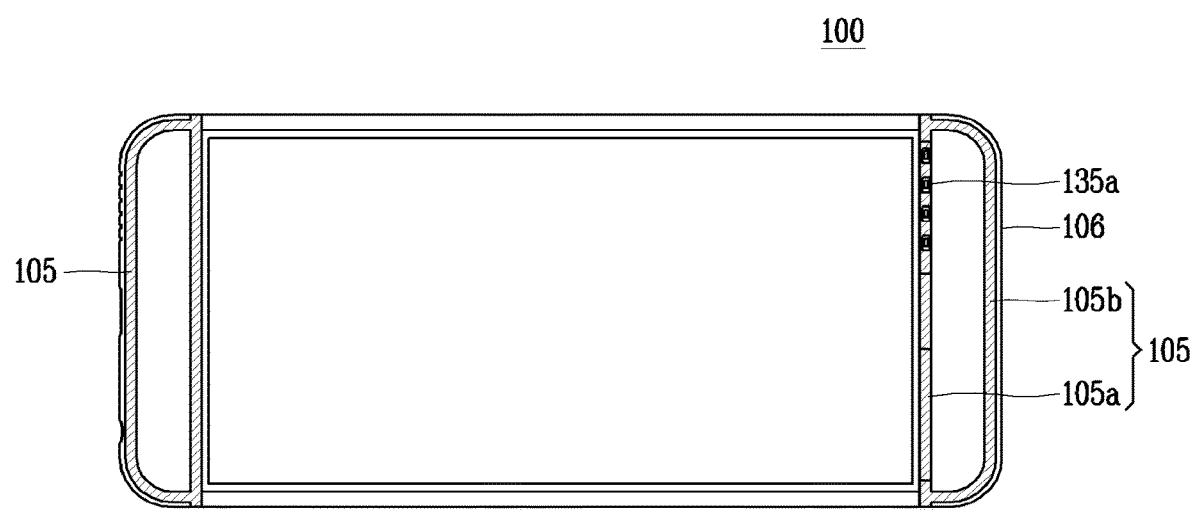
FIG. 13A shows an external appearance of a mobile terminal according to an embodiment of the present invention.
Figure 13B:
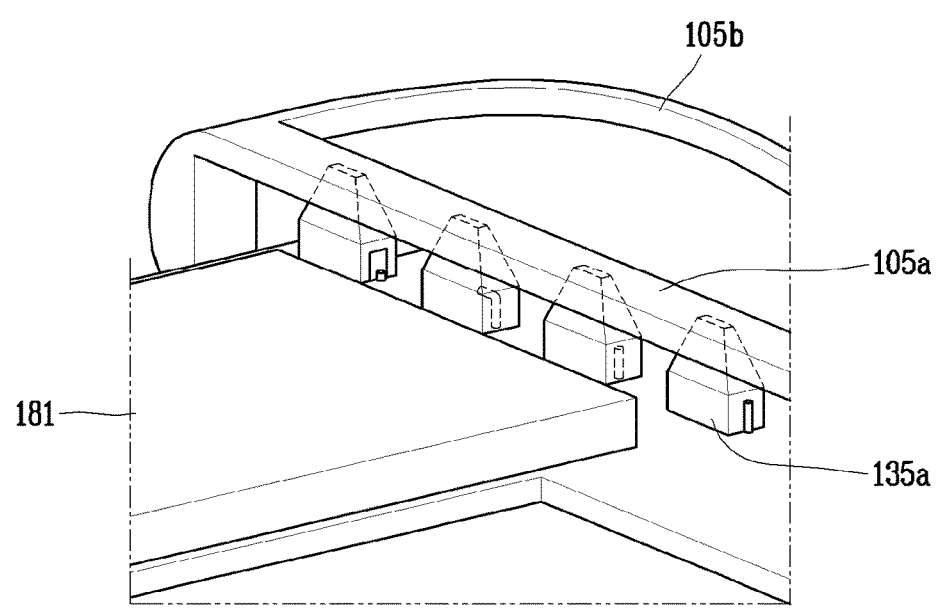
FIG. 13B shows an antenna array formed to overlap a non-metal member according to an embodiment of the present invention.

That is, FIG. 13A shows an external appearance of the mobile terminal 100 according to an embodiment of the present invention. Referring to FIG. 13A, non-metal members 105, 105a, and 105b are formed in upper and lower portions of the mobile terminal 100 to form slits. Also, FIG. 13B shows an antenna array formed to overlap the non-metal member 105 according to an embodiment of the present invention. As shown in FIG. 13B, multiple radiating dielectrics 135 are placed in the area overlapping the non-metal member 105 such that the radiation is made through the non-metal member 105. In an embodiment of the present invention, the term "overlap" means that two objects are brought into contact with each other or spaced apart from each other so that the objects partially overlap each other when viewed from a specific direction.

In this case, the non-metal member 105 may include a first non-metal member 105a formed to cover the rear surface of the terminal body and formed widthwise with respect to the mobile terminal 100 and a second non-metal member 105b formed to extend from the first non-metal member 105a and formed to rover an upper surface or a lower surface of the mobile terminal 100. The above description is related to a case in which a rear surface and/or a side surface of the mobile terminal 100 are/is made of a metal material. When the cover of the mobile terminal 100 is not made of a metal material, the placement of the dielectric 135 is not a big deal. That is, when the cover 103 is not made of a metal material, the cover 103 does not significantly affect radiation caused by the dielectric 135, and thus the degree of position freedom of the dielectric 135 is increased.

According to an embodiment of the present invention, the first dielectric 135a is placed in a position overlapping the first non-metal member 105a, and the second dielectric 135b is placed in a position overlapping the second non-metal member 105b. The second dielectric 135b is shown in FIGS. 11A and 11B.

FIG. 11 shows that a plurality of dielectrics 135 are formed adjacent to a ring member 106 according to an embodiment of the present invention. To this end, the plurality of dielectrics 135 are formed in a "V" shape. That is, as shown in FIGS. 14A and 14B, the second dielectric 135b may be formed in contact with the upper surface of the mobile terminal 100, and the second dielectric 135b is composed of a first branch 135b' and a second branch 135b". The first and second branches 135b' and 135b" are formed in an approximate "V" shape and fed by the first feeding unit 131c and the second feeding unit 131d in a duel feeding manner. In this case, the dielectric 135 may be excited using a traveling wave feeding mechanism.

In this case, the metal ring member 106 may interfere with radiation. Accordingly, by using a Yagi dipole mode and a dielectric resonator in combination, the ring member 106 itself can be prevented from acting as a reflector. To this end, according to an embodiment of the present invention, the dielectric resonator is implemented in a "V" shape, and thus the influence of an electric field between the first branch 135b' and the second branch 135" can be ignored.

In this case, a through hole 107 may be formed in the second non-metal member 105b, and an end of the first branch 135b' may be exposed outward through the through hole 107. This will be described below with reference to FIG. 12.

Figure 15:
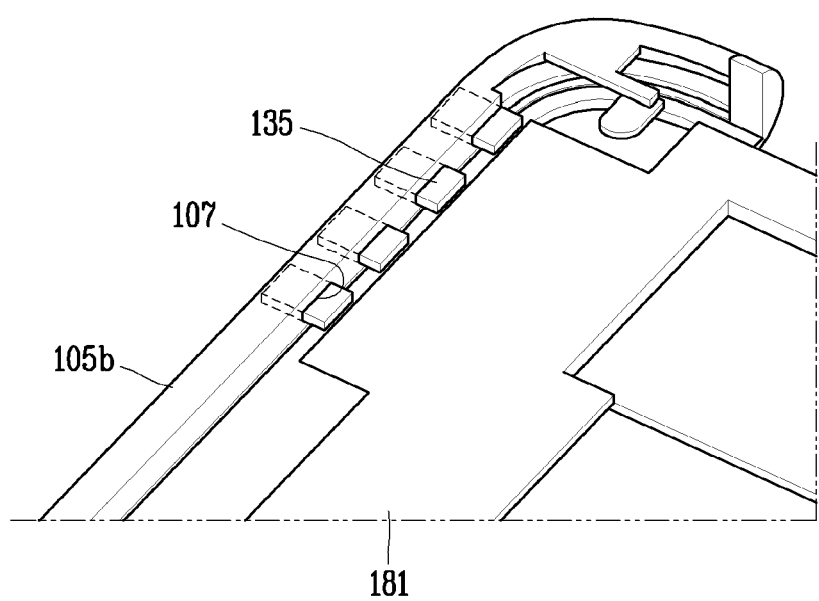
FIG. 15 shows that a plurality of dielectrics according to an embodiment of the present invention are formed through a ring member.

FIG. 15 shows that a plurality of dielectrics 135 according to an embodiment of the present invention are formed through a non-metal member 105. Referring to FIG. 12, a plurality through holes 107 are formed in a first non-metal member 105a included in the non-metal member 105, and the plurality of dielectrics 135 are exposed outward through the plurality of through holes 107.

As described above, according to an embodiment of the present invention, at least some of the dielectrics 135 are placed to overlap the non-metal member 105, and in some cases, may be exposed outward.

Designing the antenna of the present invention or controlling a signal applied to the antenna may be implemented as a computer-readable code in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

An embodiment of the present invention may be applied to a mobile terminal with a 5G antenna.

What is claimed is:

1. A mobile terminal comprising:
a terminal body;
an antenna device configured to generate a resonant frequency of a frequency band for 5G communication system,
wherein the antenna device is an antenna array including a plurality of dielectrics operating as a resonator; and
a circuit board including a feeding unit and a ground plane and configured to be inserted into each of the dielectrics such that a portion of the circuit board protrudes outward.

2. The mobile terminal of claim 1, further comprising a first antenna device provided inside the terminal body and configured to generate a resonant frequency of a first frequency band for the 5G communication system, and
wherein the antenna device is a second antenna device configured to generate resonant frequency of a second frequency band for the 5G communication system.

3. The mobile terminal of claim 2, wherein intervals between the plurality of dielectrics are 0.45 to 0.7 times a wavelength λ, corresponding to a center frequency of the second frequency band.

4. The mobile terminal of claim 1, wherein the circuit board is partially cut out to form a concave portion and a convex portion, and
wherein each of the dielectrics is inserted into the concave portion.

5. The mobile terminal of claim 1, wherein, the terminal body includes a metal cover,
a non-metal member is placed on the metal cover, and
the antenna device is placed at a position overlapping the non-metal member.

6. The mobile terminal of claim 5, wherein, the non-metal member covers an upper surface of the terminal body, and
the plurality of dielectrics are formed to overlap the non-metal member.

7. The mobile terminal of claim 6, wherein the plurality of dielectrics have a V-shaped cross section.

8. The mobile terminal of claim 6, wherein a plurality of holes are formed in the non-metal member, and the plurality of dielectrics are exposed outward through the plurality of holes.

9. The mobile terminal of claim 1, wherein a radiation pattern is formed to be omni-directional by beamforming of the plurality of dielectrics.

10. The mobile terminal of claim 1, wherein, each of the dielectrics is placed on the ground plane, and
the ground plane is formed by a plurality of via holes passing through the main circuit board, or the ground plane is implemented on a surface of an antenna chip corresponding to an internal circuit.

11. The mobile terminal of claim 1, wherein, the dielectrics are inserted up to a position separated from one end of the ground plane.

12. The mobile terminal of claim 1, wherein, the dielectrics have a shape in which first and second slots are removed from an internal region with a large higher-order mode component, and the first and second slots have lengths of $W_{L1}$ and $W_{L2}$ and a width of $W_W$.

13. The mobile terminal of claim 12, wherein the protruding portion is engaged through an insertion part of a main circuit board.

* * * * *